Oct. 8, 1929.   H. L. YOUNG   1,730,638
METHOD AND APPARATUS FOR DUSTING THE INTERIORS OF TUBES
Filed April 20, 1928
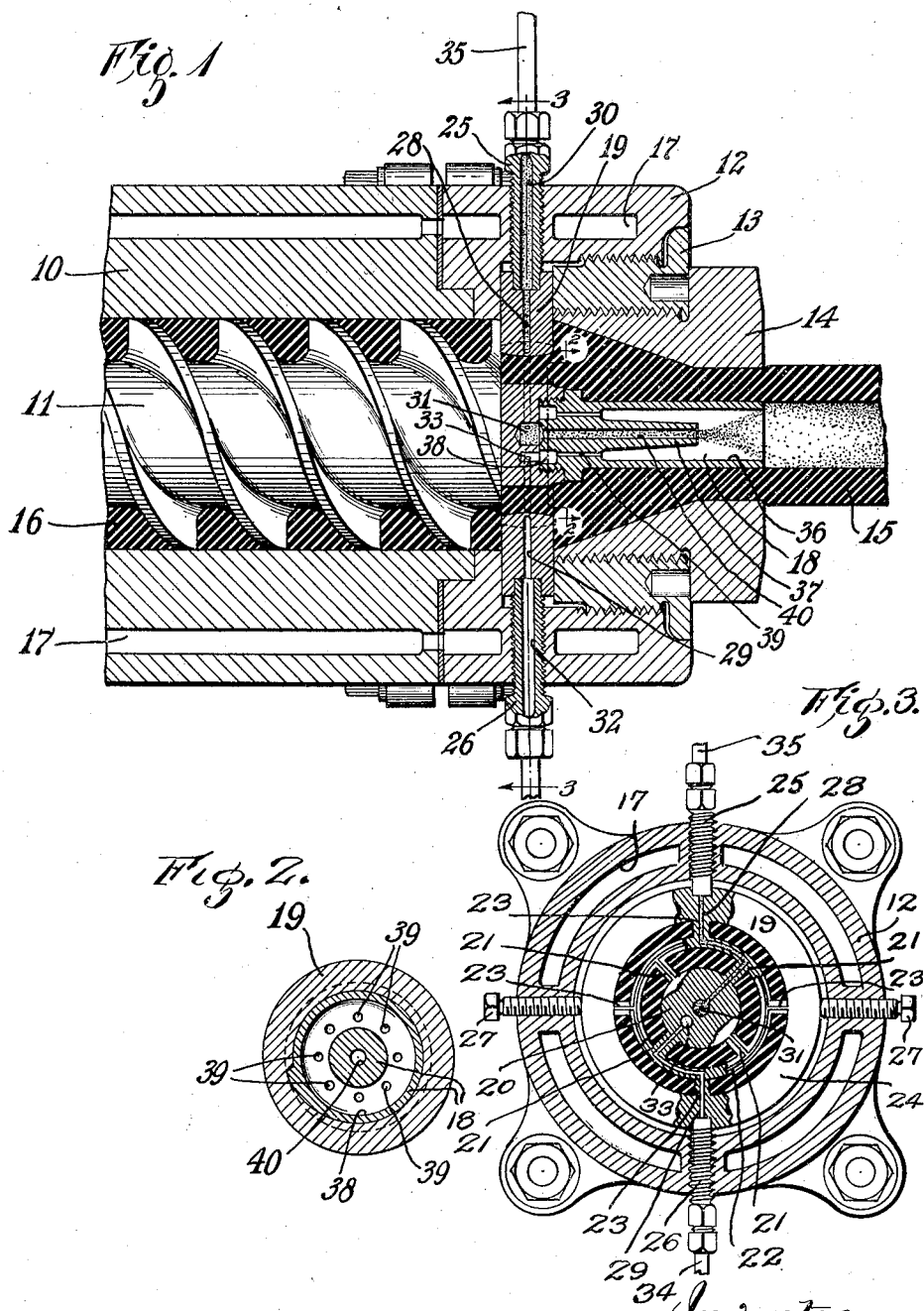

Patented Oct. 8, 1929

1,730,638

UNITED STATES PATENT OFFICE

HARVEY L. YOUNG, OF AKRON, OHIO, ASSIGNOR TO THE B. F. GOODRICH COMPANY, OF NEW YORK, N. Y., A CORPORATION OF NEW YORK

METHOD AND APPARATUS FOR DUSTING THE INTERIORS OF TUBES

Application filed April 20, 1928. Serial No. 271,562.

This invention relates to methods and apparatus for handling finely divided and abrasive materials and especially to improved procedure and apparatus for applying powdered adhesion-preventing material such as soapstone dust to the surface of an article, an example being the application of soapstone to the interior surface of a tube of warm plastic rubber composition, as the tube is extruded from a tubing machine, to prevent adhesion of the inner walls of the tube when it is subsequently collapsed.

In some of its features my invention is an improvement upon the invention comprising the subject matter of a patent to E. E. Davidson et al No. 1,603,325, issued October 19, 1926, wherein soapstone dust is conveyed by a strong current of air into a tubing machine and through a devious passage in the mandrel-supporting spider therein and through an axial passage in the mandrel to be ejected therefrom so that it impinges against the tacky inner surface of a tube being extruded from the tubing machine. In practice it has been found that the strong blast of air necessary to convey the requisite amount of dust through the apparatus to the interior of the tube impels the particles of dust against the wall of the passage in the spider, at the turns thereof, with such force as quickly to wear a hole through the wall, with the result that the plastic rubber composition, by entering the dust passage through the hole, has interfered with the flow of dust.

The chief object of this invention is to avoid abrasion of the conduit in conducting abrasive material from a source of supply and projecting it from a terminus of the conduit. Other objects will be manifest in the following specification.

Of the accompanying drawings:

Fig. 1 is a vertical, longitudinal section of the delivery-end portion of a tubing machine embodying and adapted to carry out my invention in its preferred form.

Fig. 2 is a section on line 2—2 of Fig. 1 on an enlarged scale.

Fig. 3 is a section on line 3—3 of Fig. 1 with parts broken away and in section.

Referring to the drawings, 10 is the cylinder or barrel, 11 the feed screw, 12 the head, 13 the die-holding bushing, and 14 the die of a tubing machine of well-known design adapted to extrude a rubber tube, such as the tube 15, from a supply mass of unvulcanized rubber composition 16, the latter being kept warm and plastic by steam which circulates in the passages 17, 17 of said cylinder and head. The tubing machine is provided with an improved mandrel 18 which is mounted upon an improved mandrel-holding spider 19.

The spider 19 comprises a hub portion 20 into which the rear end of the mandrel is threaded. A series of spider-arms 21, 21, here shown as four, radiate from said hub, an annular web-ring 22 connects the outer ends of said arms, a second series of spider-arms 23, 23, circumferentially offset or staggered with relation to those of the first set, radiate from said ring 22, and a relatively heavy outer ring 24 connects the ends of the arms 23. The spider is axially centered with relation to the feed-screw 11 and die 14 by axially apertured plugs 25, 26 threaded through the head 12 and engaging the top and bottom respectively of the spider, and by set-screws 27, 27 threaded through the head 12 and engaging the sides of the spider. The hub arms and rings define an inner and outer series of passages, the passages of one series overlapping those of the other series, circumferentially of the machine. The arms 21, 23 and the ring 22 preferably are thinned toward their front and rear edges to permit a smooth and substantially stream-line flow of the stock 16.

The spider 19 is formed with two conduits or passages, one passage 28 for soapstone dust and one passage 29 for pressure fluid such as compressed air. The passage 28 communicates at its outer end with the axial bore 30 of the plug 25, and extends longitudinally in one of the outer set of radial arms 23, circumferentially in the ring 22, to the adjacent radial arm 21 of the inner set, and longitudinally in the latter to an axial recess 31 in the spider's hub 20. In like manner the passage 29 communicates at its outer end with the axial bore 32 of the plug 26 and extends in a devious course through the spider and terminates at its inner end in a recess 33 extending into the spider's hub 20 from its front face at one side of the axial recess 31 therein.

The plug 26 is connected with a pipe 34 which communicates with a suitable supply of compressed air, and the plug 25 is connected by a pipe 35 with a supply of soapstone dust (not shown), the soapstone supply preferably being at an elevated position so as to descend through the pipe 35 and through the passage 28 by gravity. Means may be provided for feeding the soapstone into the pipe 35 in a determinate quantity.

The mandrel 18 comprises a generally tubular portion 36, and a smaller, coaxial nozzle portion 37 positioned within the same somewhat behind the front end thereof, said tubular portion and nozzle portion being united adjacent their rear ends. The rear end-face of the mandrel is formed with a concentric annular groove 38, and an annular series of passages 39, 39 extend from said groove through the wall connecting the rear portions of the tubular and nozzle portions of the mandrel and terminate in the space between the forward ends thereof. The position of the groove 38 is such that it communicates with the recess 33 in the spider-hub, and the nozzle portion 37 is formed with an axial bore 40 which communicates with the axial recess 31 in the spider-hub.

In the operation of the apparatus the plastic rubber composition 16 is fed through the machine barrel 10 and spider 19 by the feed-screw 11, and issues from the die 14 in the form of a tube 15 in a manner well-known in the art. The powdered soapstone fed into the upper end of the pipe 35 descends slowly therein by gravity in a loosely packed column, so that severe abrasion of the conduit wall, especially at the turns, is avoided, and passes through the plug-aperture 30 and passage 28 in the spider to the recess 31 in the hub of the latter, which communicates with the bore 40 in the nozzle 37. Compressed air entering through the pipe 34 passes through the plug aperture 32 and passage 29 in the spider 19 to the recess 33 of the spider-hub, then through the passage 39 to the mandrel 18 and past the nozzle 37 therein before passing from the mandrel and entering the tube 15 as the latter is extruded between the mandrel and die.

The effect of the strong blast of air passing the end of the nozzle 37 is to create suction within the bore 40 of the nozzle and thereby to draw the column of soapstone dust therethrough. Passing from the nozzle at the forward end thereof at accelerated speed the soapstone mixes with the moving air in the larger tubular portion 36 of the mandrel and disperses therein, with the result that the air coming into contact with the inner surface of the tube 15 will leave a light, uniformly distributed layer of soapstone adhered thereto.

My invention may be variously modified and I do not wholly limit my claims to the specific construction or exact procedure described.

I claim:

1. The method of applying a powdered material to the interior of an extruded tube during the extrusion thereof which comprises slowing conveying a column of the material through the extruding machine to the interior of the tube and there blowing it against the wall of the tube.

2. The method of applying a powdered material to the interior of an extruded tube during the extrusion thereof which comprises slowing conveying a column of the material through the extruding machine by gravity to the interior of the tube and there blowing it against the wall of the tube.

3. The method of applying a finely divided and abrasive adhesion-preventing material to a plastic tube while the latter is formed in a tubing machine having a devious conduit for the material which comprises feeding the material in a loosely-packed, slow-moving column in said conduit to the terminus thereof and impelling it from said terminus, in a gaseous current, against the inner face of the tube.

4. Tube-forming apparatus comprising an extruding machine including a hollow mandrel and a mandrel-supporting spider, the latter being formed with respective passages for bringing a column of adhesive-preventing material and a column of air to the interior of the mandrel and the mandrel being so formed as to cause the air to mix with the said material in the mandrel and propel it therefrom into a tube passing from the extruding machine.

5. Tube-forming apparatus comprising an extruding machine including a hollow mandrel and a supporting spider therefor, the latter being formed with respective passages for bringing a column of adhesion-preventing material and a column of compressed air to the interior of the mandrel, and the mandrel being so formed that the air passing therethrough creates a suction for drawing the said material thereinto.

6. Tube-forming apparatus comprising an extruding machine including a hollow mandrel and a supporting spider therefor, said spider being formed with respective passages for bringing a column of adhesion-preventing material and a column of compressed air to the mandrel, and the mandrel being formed with an internal, axial nozzle in communication with the material-conducting passage of the spider, and with air passages so disposed as to direct the current of air past the delivery end of said nozzle.

In witness whereof I have hereunto set my hand this 17th day of April, 1928.

HARVEY L. YOUNG.